United States Patent
Lee et al.

(10) Patent No.: US 12,192,692 B2
(45) Date of Patent: Jan. 7, 2025

(54) ELECTRONIC DEVICE INCLUDING MICROPHONE MODULE

(71) Applicant: Samsung Electronics Co., Ltd., Suwon-si (KR)

(72) Inventors: Kyuho Lee, Suwon-si (KR); Youngseok Bang, Suwon-si (KR); Juntaek Oh, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 17/994,195

(22) Filed: Nov. 25, 2022

(65) Prior Publication Data

US 2023/0188878 A1   Jun. 15, 2023

Related U.S. Application Data

(63) Continuation of application No. PCT/KR2022/017982, filed on Nov. 15, 2022.

(30) Foreign Application Priority Data

Dec. 10, 2021  (KR) .................. 10-2021-0176865
Jan. 10, 2022  (KR) .................. 10-2022-0003486

(51) Int. Cl.
*H04R 1/04* (2006.01)
*H04M 1/02* (2006.01)

(52) U.S. Cl.
CPC ............ *H04R 1/04* (2013.01); *H04M 1/0249* (2013.01); *H04M 1/0277* (2013.01)

(58) Field of Classification Search
None
See application file for complete search history.

(56) References Cited

U.S. PATENT DOCUMENTS 11,310,581 B1 * 4/2022 Shanmugam ............ H01Q 9/40
11,323,796 B2    5/2022 Fukahori et al.
(Continued)

FOREIGN PATENT DOCUMENTS

CN   206313955 U   7/2017
CN   209766631 U   12/2019
(Continued)

OTHER PUBLICATIONS

Monopole Antenna, 2021 https://www.sciencedirect.com/topics/computer-science/monopole-antenna.
(Continued)

*Primary Examiner* — James K Mooney
(74) *Attorney, Agent, or Firm* — Jefferson IP Law, LLP

(57) ABSTRACT

An electronic device is provided. The electronic device includes a housing, a support member disposed inside the housing and forming a connection passage, a printed circuit board disposed on the support member and including a first area and a second area spaced apart from the first area, and a conductive pattern disposed on the support member and including a first portion and a second portion, wherein the first portion may be electrically connected to a first electrode disposed in the first area, the second portion may be electrically connected to a second electrode disposed in the second area, and the first area and the second area may be electrically connected to each other via a shunt member.

20 Claims, 14 Drawing Sheets

(56) References Cited

U.S. PATENT DOCUMENTS

| | | | |
|---|---|---|---|
| 2016/0050474 A1* | 2/2016 | Rye | H05K 7/1427 |
| | | | 381/152 |
| 2017/0201821 A1 | 7/2017 | Mcauliffe et al. | |
| 2020/0136241 A1 | 4/2020 | Shriner et al. | |
| 2020/0221210 A1 | 7/2020 | Grebe et al. | |
| 2021/0044885 A1 | 2/2021 | Fukahori et al. | |
| 2021/0176557 A1 | 6/2021 | Schreuder | |
| 2021/0250676 A1 | 8/2021 | Kim et al. | |
| 2022/0361319 A1 | 11/2022 | Park et al. | |

FOREIGN PATENT DOCUMENTS

| | | |
|---|---|---|
| CN | 212211345 U | 12/2020 |
| CN | 213124720 U | 5/2021 |
| JP | 2021-029006 A | 2/2021 |
| KR | 10-2021-0041572 A | 4/2021 |
| KR | 10-2021-0099970 A | 8/2021 |
| KR | 10-2021-0101597 A | 8/2021 |

OTHER PUBLICATIONS

International Search Report dated Feb. 21, 2023, issued in an International Application No. PCT /KR2022/017982.

* cited by examiner

ELECTRONIC DEVICE INCLUDING MICROPHONE MODULE

CROSS-REFERENCE TO RELATED APPLICATION(S)

This application is a continuation application, claiming priority under § 365(c), of an International application No. PCT/KR2022/017982, filed on Nov. 15, 2022, which is based on and claims the benefit of a Korean patent application number 10-2021-0176865, filed on Dec. 10, 2021, in the Korean Intellectual Property Office, and of a Korean patent application number 10-2022-0003486, filed on Jan. 10, 2022, in the Korean Intellectual Property Office, the disclosure of each of which is incorporated by reference herein in its entirety.

TECHNICAL FIELD

The disclosure relates to an electronic device including a microphone module. The disclosure relates to an electronic device including a microphone module capable of improving wireless communication performance.

BACKGROUND ART

With the development of electronic technology, various types of wearable electronic devices are required to be miniaturized and to be provided with various functions. In order to meet to these requirements, various electronic components are mounted on a printed circuit board (PCB).

One or more sound effect-related components may be mounted on a printed circuit board of a wearable electronic device. The sound effect-related components may include, for example, a speaker and a microphone, and these components may be mounted within the housing of the wearable electronic device with various shapes and arrangements corresponding to the exterior design of the wearable electronic device that is designed in various ways.

The electronic device mounted with the speaker and the microphone may be, for example, an in-ear earphone (or an earset, a headphone, or a headset) or a hearing aid. The wearable electronic device may be worn near a user's ear and may be manufactured in a compact size for this purpose.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A wearable electronic device that is wearable on a body may include one or more sound effect-related components. For example, a wearable electronic device including a speaker and a microphone may be worn on a portion close to a user's ear like an in-ear earphone (or an earset) or a hearing aid.

As wearable electronic devices are miniaturized, electronic components mounted within the wearable electronic devices are also miniaturized. As wearable electronic devices are miniaturized and spaces in which electronic components are disposed become smaller, the lengths of antenna radiators used for wireless communication also decrease, which may cause deterioration in wireless communication performance.

Aspects of the disclosure are to address at least the above-mentioned problems and/or disadvantages and to provide at least the advantages described below. Accordingly, an aspect of the disclosure is to provide an electronic device capable of improving wireless communication performance.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing, a support member disposed inside the housing and forming a connection passage, a printed circuit board disposed adjacent to the support member and including a first area and a second area spaced apart from the first area, and a conductive pattern disposed on the support member and including a first portion and a second portion, wherein the first portion may be electrically connected to a first electrode disposed in the first area, the second portion may be electrically connected to a second electrode disposed in the second area, and the first area and the second area may be electrically connected to each other via a shunt member.

In accordance with another aspect of the disclosure, an electronic device is provided. The electronic device includes a housing, a support member disposed in the housing, a printed circuit board disposed on the support member and including a first area and a second area spaced apart from the first area, a conductive pattern disposed adjacent to the support member and including a first portion and a second portion, and a microphone module disposed in the second area, wherein the first portion may be electrically connected to a first electrode disposed in the first area, the second portion may be electrically connected to a second electrode disposed in the second area, and the second electrode may be disposed adjacent to the microphone module.

Advantageous Effects

With an electronic device according to various embodiments of the disclosure, it is possible to secure the length of an antenna radiator to improve wireless communication performance. Specifically, by securing the length of an antenna radiator, it is possible to secure antenna performance for various frequency bands.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
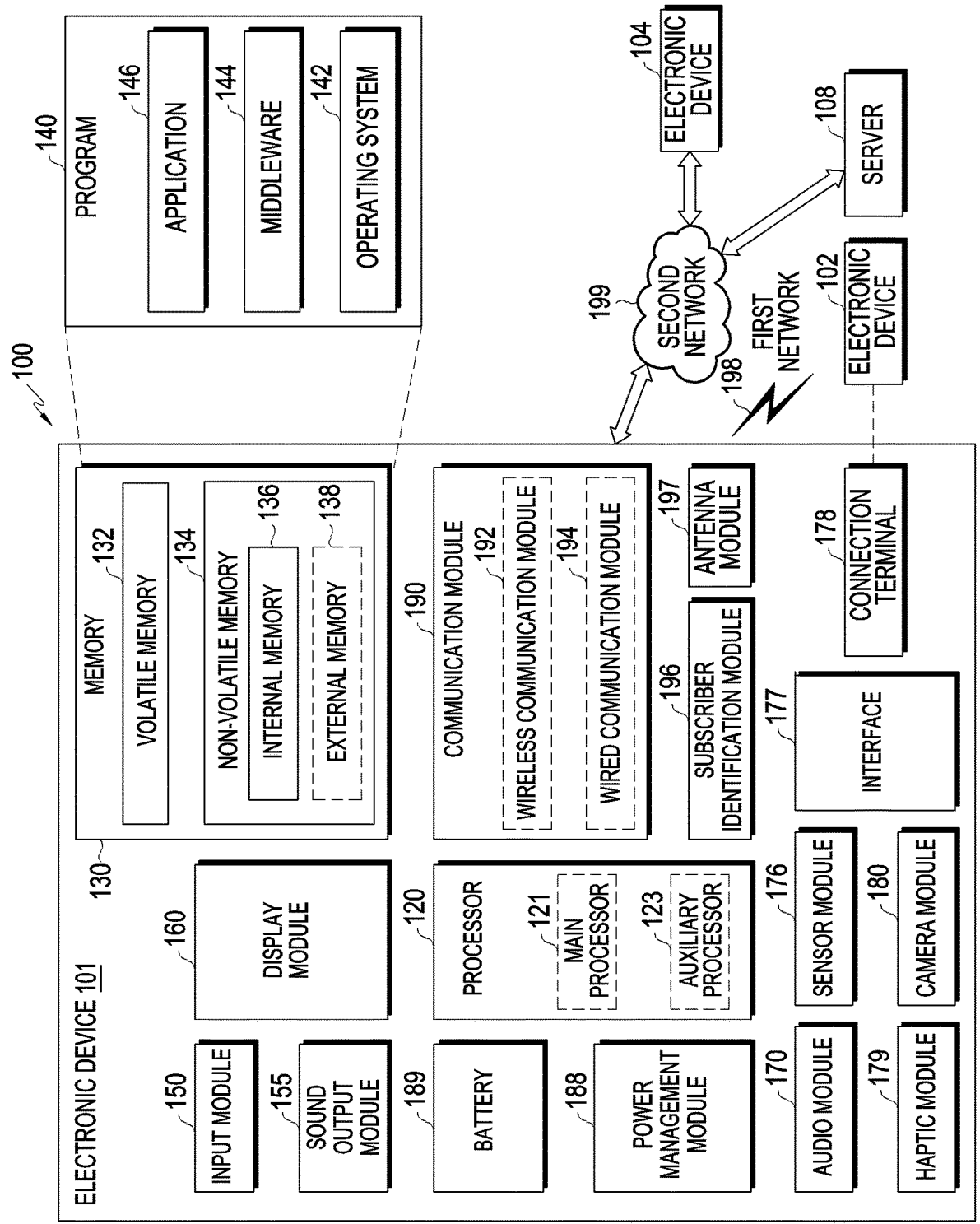
FIG. 1 is a block diagram of an electronic device an in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
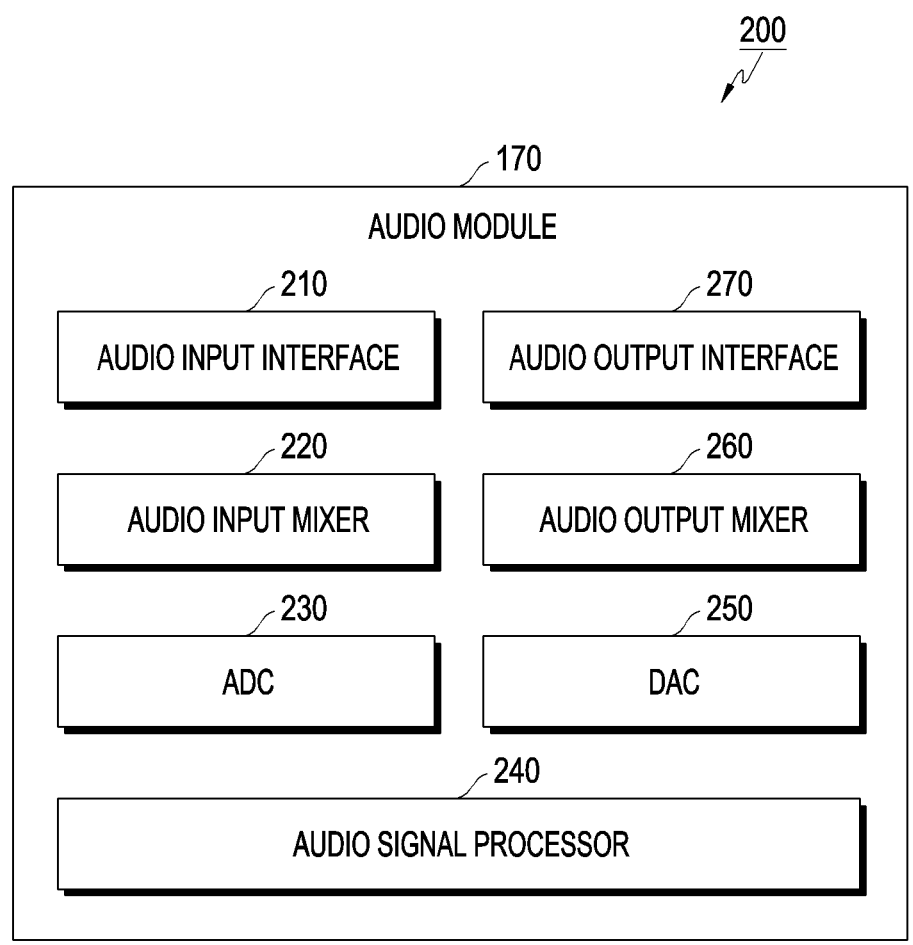
FIG. 2 is a block diagram of an audio module according to an embodiment of the disclosure.

FIG. 2 is a block diagram 200 illustrating an audio module according to an embodiment.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3A:
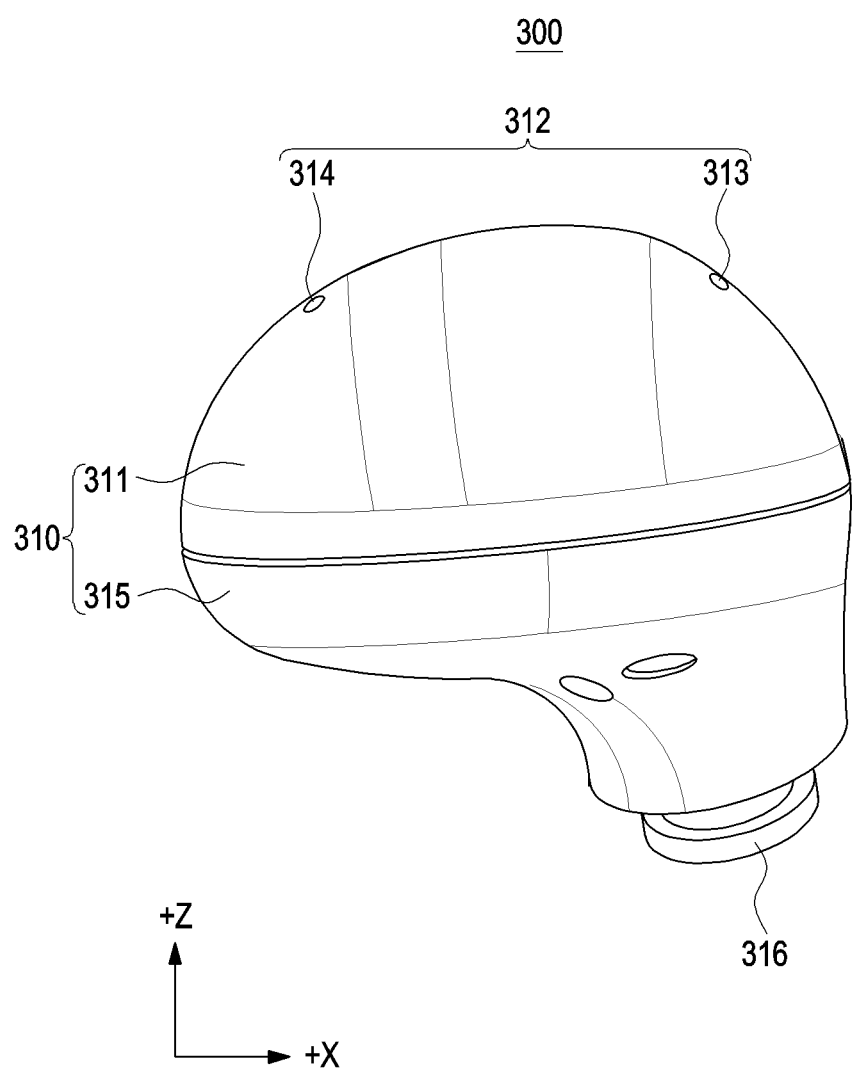
FIG. 3A is a side view of an electronic device according to an embodiment of the disclosure.

FIG. 3A is a side view of an electronic device according to an embodiment of the disclosure.

Figure 3B:
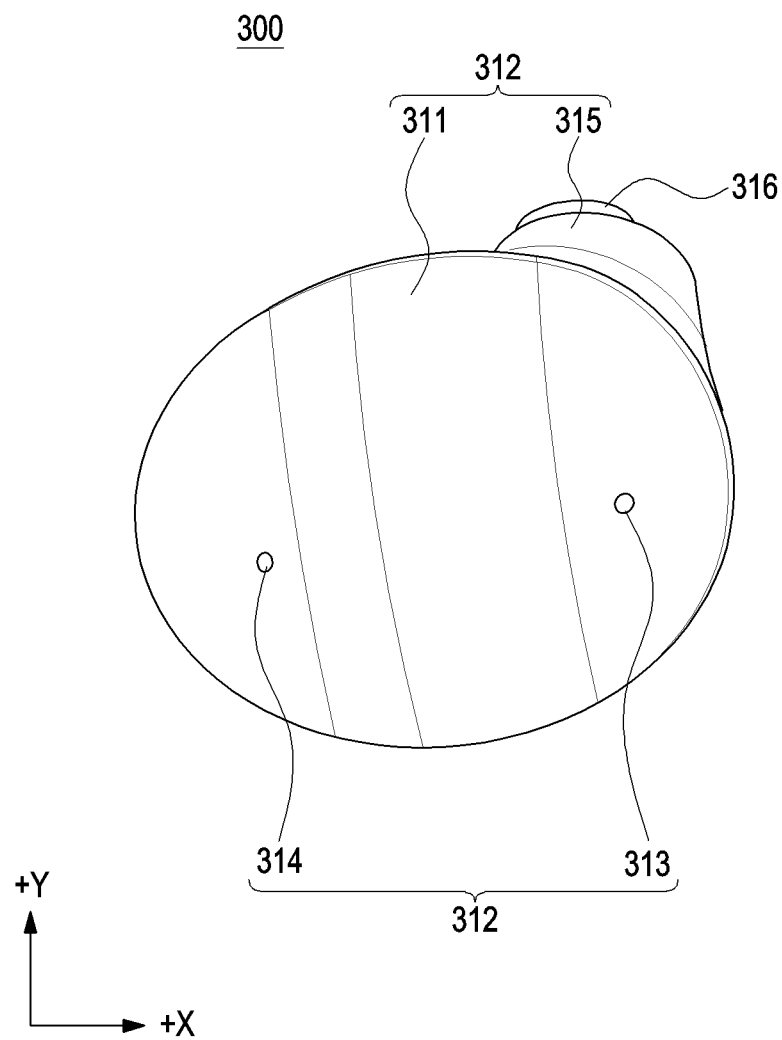
FIG. 3B is a top view of an electronic device according to an embodiment of the disclosure.

FIG. 3B is a top view of an electronic device according to an embodiment of the disclosure.

Referring to FIGS. 3A and 3B, an electronic device 300 (e.g., the electronic device 100 in FIG. 1) may include a housing 310 for accommodating components of the electronic device 300. For example, inside the housing 310, sound components (e.g., the audio module 170 in FIG. 2) and electronic components (e.g., the processor 120, the power management module 188, the battery 189, or a wireless communication module 192 in FIG. 1) may be arranged. The components of the electronic device 300 of FIGS. 3A and 3B may be substantially the same as all or some of the components of the electronic device 101 of FIG. 1. Accordingly, a description of the same components may be omitted.

According to various embodiments, the electronic device 300 may include a wearable electronic device. For example, the electronic device 300 may be worn on a part of a body, for example, an ear or a head. According to an embodiment, the electronic device 300 may include an in-ear earset, an in-ear headset, or a hearing aid.

According to various embodiments, as illustrated in FIGS. 3A and 3B, the electronic device 300 may have an asymmetric shape. According to an embodiment, since the electronic device 300 is configured to have an asymmetric shape, the electronic device 300 may be ergonomically designed, and may be improved in user convenience. According to an embodiment, since the electronic device 300 is configured to have an asymmetric shape, the sound components (e.g., the audio module 170 in FIG. 2) and electronic components (e.g., the processor 120 in FIG. 1) inside the housing 310 may be arranged to improve sound performance.

According to various embodiments, the electronic device 300 may be wirelessly connected to an external electronic device (e.g., the external electronic device 102 of FIG. 1) to communicate with the external electronic device via the wireless communication module 192. According to an embodiment, the electronic device 300 may function as an audio output interface (or, for example, the sound output module 155 in FIG. 1) that outputs, to the outside, a sound signal received from the external electronic device 102.

Additionally or alternatively, the electronic device 300 disclosed herein may function as an audio input interface (or the input module 150 in FIG. 1) for receiving an audio signal corresponding to sound acquired from the outside of the electronic device 300.

According to an embodiment, the electronic device 300 may communicate with and/or be controlled by the external electronic device 102. The electronic device 300 may be an interaction-type electronic device that is paired with the external electronic device 102, such as a smartphone, via a communication scheme, such as Bluetooth, by suing the wireless communication module 192 and converts data received from the external electronic device 102 to output sound or receives a user's voice and transmits the same to the external electronic device 102.

According to an embodiment, the electronic device 300 may be wirelessly connected to the external electronic device 102. For example, the electronic device 300 may communicate with the external electronic device 102 via a network (e.g., a short-range wireless communication network or a long-range wireless communication network). The network may include, but is not limited to, a mobile or cellular network, a local area network (LAN) (e.g., Bluetooth communication), a wireless local area network (WLAN), a wide area network (WAN), the Internet, or a small area network (SAN). According to an embodiment, the electronic device 300 may be connected to the external electronic device 102 in a wired manner by using a cable (not illustrated).

According to another embodiment, the electronic device 300 may not communicate with the external electronic device 102. In this case, the electronic device 300 may be implemented not to be controlled via the external electronic device 102, but to receive a signal corresponding to sound acquired from the outside according to the operation (or control) of components themselves included in the electronic device 300 and to output a sound signal to the outside. For example, the electronic device 300 may be a stand-alone type electronic device that plays back the music or moving images stored in a memory (e.g., the memory in FIG. 1) by itself without communicating with the external electronic device 102 and outputs corresponding sound, or receives and processes user voice.

As an example of the electronic device 300 as an object of the disclosure, various drawings of the disclosure may illustrate a kernel-type in-ear earset that is mainly mounted in an external auditory meatus mainly from a pinna to an eardrum. However, it should be noted that the disclosure is not limited thereto. According to another embodiment, although not illustrated in the drawings, the electronic device 300 as an object of the disclosure may be an open-type earphone to be mounted on a pinna.

According to various embodiments, the housing 310 may include a plurality of components. For example, the housing 310 may include a first housing 311 and a second housing 315 connected to the first housing 311. According to an embodiment, the first housing 311 and the second housing 315 may define at least a portion of the exterior of the electronic device 300 and define an internal space in which components of the electronic device 300 are accommodated. According to an embodiment, in a state in which a user wears the electronic device 300, at least a portion of the second housing 315 comes into contact with or faces the user's body (e.g., an ear), and at least a portion of the housing 311 may face away from the user.

According to various embodiments, the housing 310 may include a microphone hole 312. According to an embodiment, the microphone hole 312 may be interpreted as a through hole provided in the first housing 311. According to an embodiment, sound outside the electronic device 300 may pass through the microphone hole 312 to be transmitted to a microphone module (e.g., a microphone module 330 in FIG. 4D) located inside the electronic device 300. According to an embodiment, the microphone hole 312 may include a plurality of microphone holes 313 and 314. The microphone hole 312 may include a first microphone hole 313 and/or a second microphone hole 314 spaced apart from the first microphone hole 313. According to an embodiment, the first microphone hole 313 may be disposed closer to a protrusion 316, which will be described later, than the second microphone hole 314. According to an embodiment, the first microphone hole 313 may be provided to communicate with a first connection passage (e.g., a first connection passage 328 in FIG. 4B) to be described later, and the second microphone hole 314 may be provided to communicate with a second connection passage (e.g., a second connection passage 329 in FIG. 4B) to be described later.

According to various embodiments, the housing 310 may include a protrusion 316. According to an embodiment, at least a portion of the protrusion 316 may be inserted into the user's body (e.g., an ear). For example, the electronic device 300 may be inserted into and mounted in the user's body (e.g., an external auditory meatus or a pinna of the body) by using the protrusion 316. According to an embodiment, the protrusion 316 may be configured as a portion of the housing 310 extending from the second housing 315. According to an embodiment, an ear tip (not shown) may be additionally mounted on the protrusion 316, and the electronic device 300 may be in close contact with the user's ear by using the ear tip. According to an embodiment, the protrusion 316 may include at least one recess (not illustrated), and sound output from a speaker module (e.g., the audio module 170 in FIG. 2) arranged inside the electronic device 300 may be emitted to the outside of the electronic device 300 via the recess located in the protrusion 316.

Figure 4A:
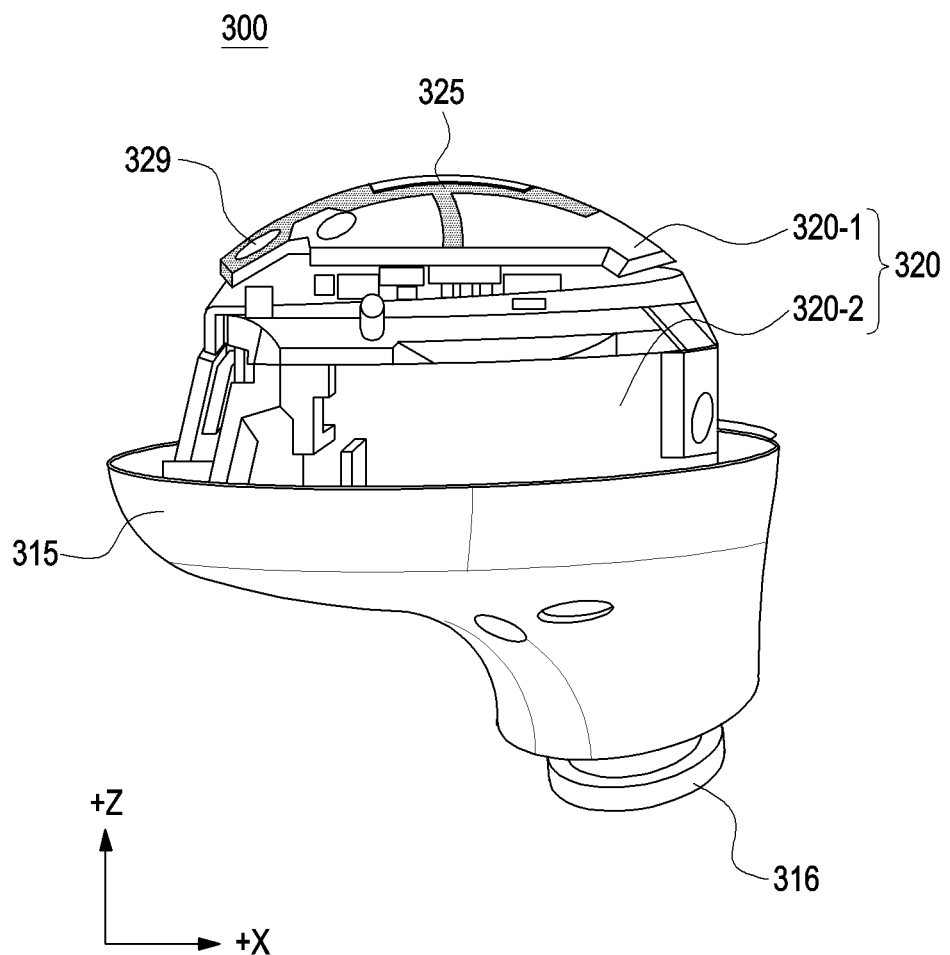
FIG. 4A is a side view of an electronic device in which a first housing is excluded according to an embodiment of the disclosure.

FIG. 4A is a side view of an electronic device in which a first housing is excluded according to an embodiment of the disclosure.

Figure 4B:
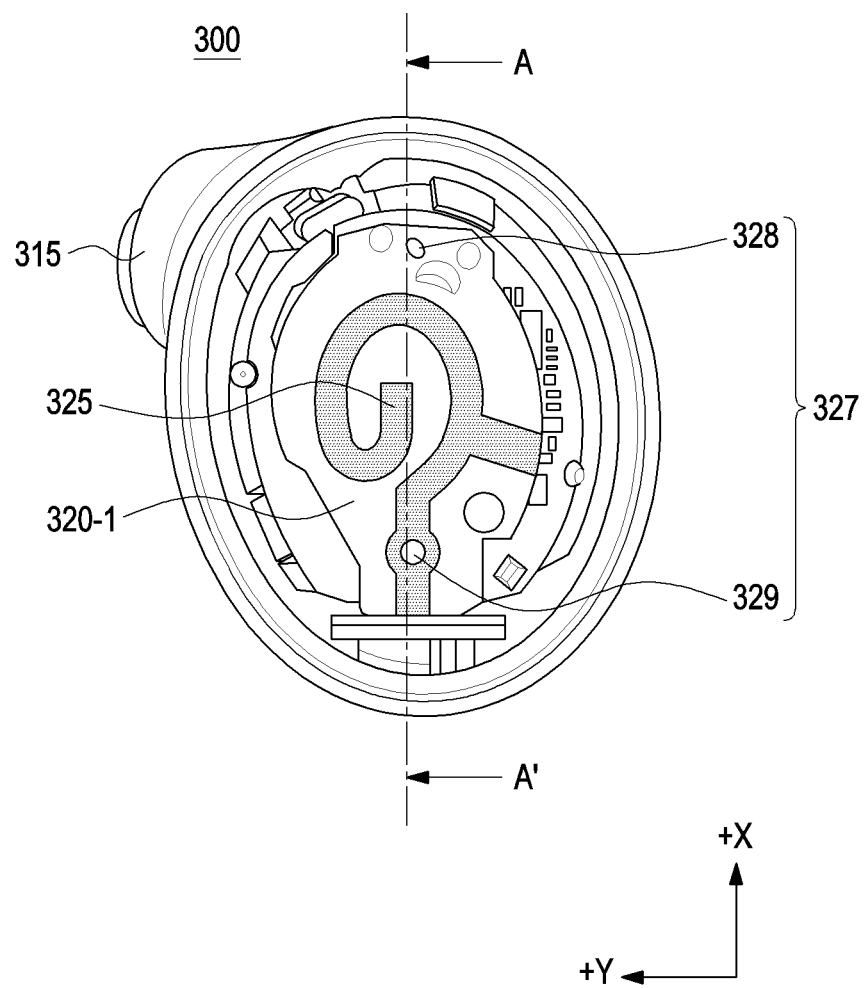
FIG. 4B is a top view of an electronic device in which a first housing is excluded according to an embodiment of the disclosure.

FIG. 4B is a top view of an electronic device in which a first housing is excluded according to an embodiment of the disclosure.

Figure 4C:
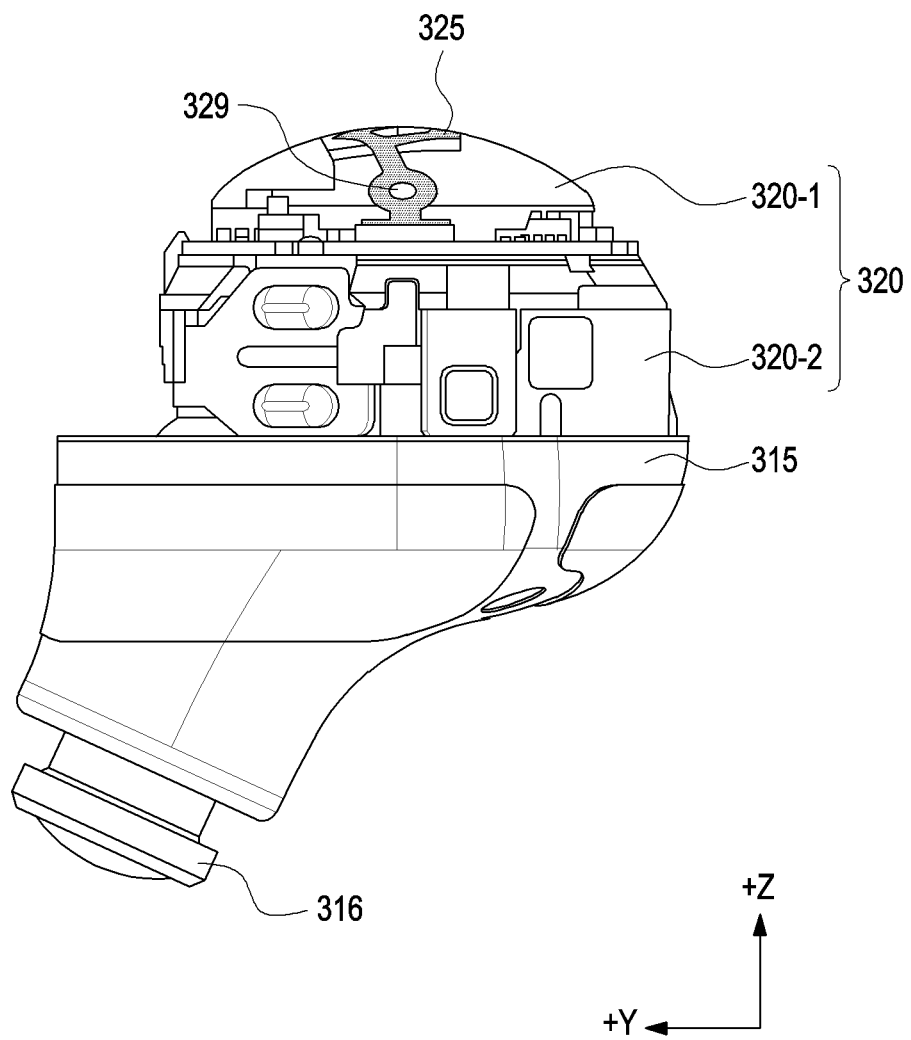
FIG. 4C is a side view of an electronic device in which a first housing is excluded according to an embodiment of the disclosure.

FIG. 4C is a side view of an electronic device in which a first housing is excluded according to an embodiment of the disclosure.

Figure 4D:
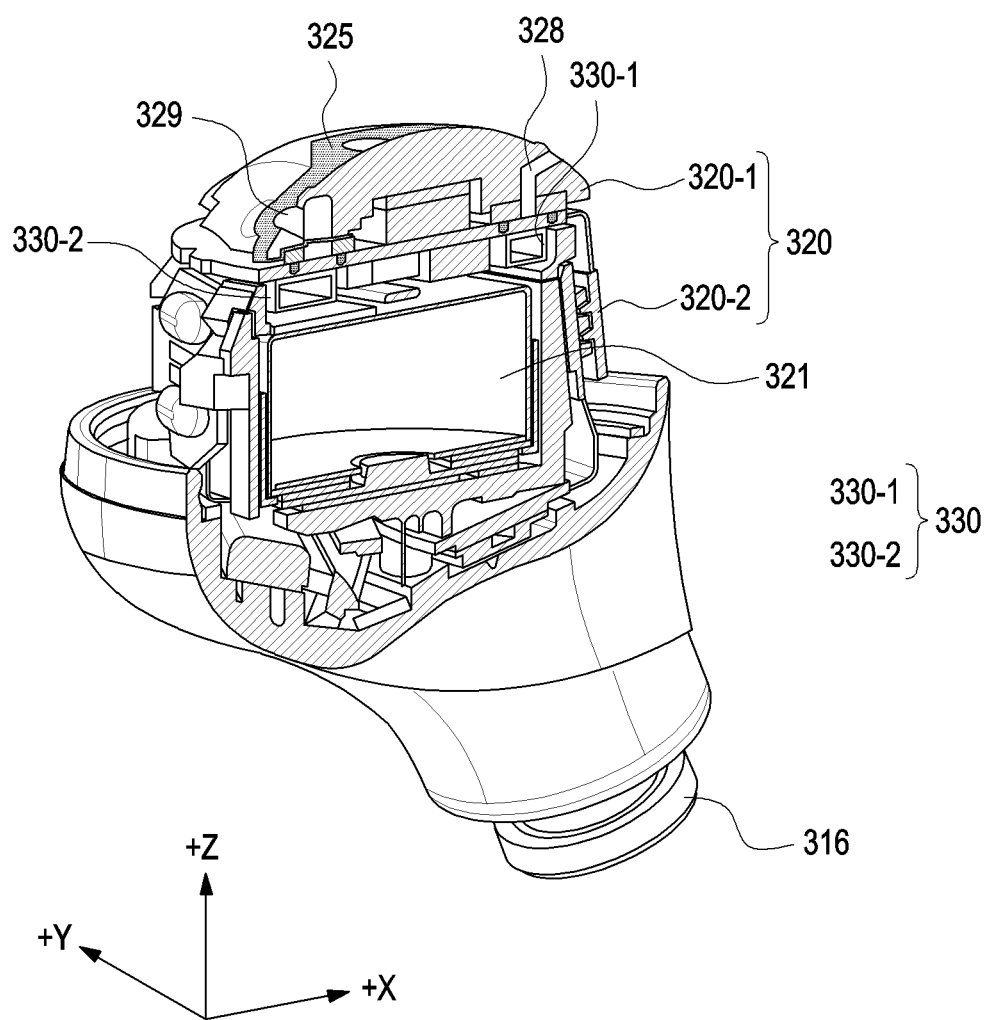
FIG. 4D is a cross-sectional view of an electronic device, taken along line A-A' in FIG. 4B, in which a first housing is excluded according to an embodiment of the disclosure.

FIG. 4D is a cross-sectional view of an electronic device, taken along line A-A' in FIG. 4B, in which the first housing is excluded according to an embodiment of the disclosure.

Referring to FIGS. 4A, 4B, 4C, and 4D, the electronic device 300 may include a second housing 315 and a support member 320. Some or all of the components of the electronic device 300 and the second housing 315 of FIGS. 4A, 4B, 4C, and 4D may be the same as those of the electronic device 300 and the second housing 315 of FIGS. 3A and 3B. Accordingly, a description of the same components may be omitted.

According to various embodiments, the support member 320 may be disposed within the housing (e.g., the housing 310 in FIG. 3A). For example, at least a portion of the support member 320 may be surrounded by the housing 310 (e.g., the first housing 311 and/or the second housing 315 in FIG. 3A). According to an embodiment, the support member 320 may include a first support member 320-1 and a second support member 320-2.

According to various embodiments, the support member 320 may be used as an antenna carrier on which a conductive pattern 325 may be disposed. According to an embodiment, at least a portion of the support member 320 (e.g., the first support member 320-1) may be integrated with the first housing (e.g., the first housing 311 in FIG. 3A). The first support member 320-1 may be connected to the first housing 311 through insert injection molding or double shot injection molding. According to an embodiment, the first housing 311 may be coupled to the second housing 315 in the state of being connected to the first support member 320-1.

According to an embodiment, a battery 321 may be disposed inside the support member 320. The battery 321 may supply power required to drive the wearable electronic device 300.

According to an embodiment, a connection passage 327 may be provided or disposed in the first support member 320-1. The connection passage 327 is an empty space defined in the support member 320, and at least a portion of the connection passage 327 may serve as a microphone chamber. According to an embodiment, the support member 320 may include a second support member 320-2 (e.g., an inner housing) that supports at least a portion of a component (e.g., the battery 321) of the electronic device 300. According to an embodiment, the first support member 320-1 may be connected to the second support member 320-2. According to another embodiment, the first support member 320-1 may be integrated with the second support member 320-2.

According to various embodiments, the conductive pattern 325 may be disposed on the support member 320. According to an embodiment, the conductive pattern 325 may be disposed on the first support member 320-1. According to an embodiment, some or all of the components of the conductive pattern 325 may be the same as those of the antenna module 197 of FIG. 1. According to an embodiment, the conductive pattern 325 may be a laser direct structuring antenna formed on the support member 320 (e.g., the first support member 320-1). For example, the support member 320 (e.g., the first support member 320-1) may include a thermoplastic resin (e.g., polycarbonate) and a pattern provided on the thermoplastic resin by using a laser. The conductive pattern 325 may include a metal (e.g., copper (Cu) and/or nickel (Ni)) disposed on or plated on the pattern provided on the support member 320 (e.g., the first support member 320-1).

According to various embodiments, the conductive pattern 325 may be disposed on the surface of the support member 320. According to an embodiment, the conductive pattern 325 may be disposed on the surface of the first support member 320-1. According to an embodiment, the conductive pattern 325 may be disposed to face the first housing (e.g., the first housing 311 in FIG. 3A). According to an embodiment, at least a portion of the conductive pattern 325 may be disposed between a first connection passage 328 corresponding to the position of the first microphone hole (e.g., the first microphone hole 313 of FIG. 3A) and a second connection passage 329 corresponding to the position of the second microphone hole (e.g., the second microphone hole 314 in FIG. 3A). According to an embodiment, the conductive pattern 325 may be disposed adjacent to the second connection passage 329. For example, the conductive pattern 325 may be disposed to at least partially surround the second connection passage 329. According to an embodiment, the conductive pattern 325 may be disposed to be spaced apart from the first connection passage 328.

According to various embodiments, the support member 320 may include a connection passage 327. According to an embodiment, the connection passage 327 may receive sound outside the electronic device 300 from a microphone hole (e.g., the microphone hole 312 in FIG. 3A). For example, the sound or vibration outside the electronic device 300 may be transmitted to the microphone module 330 through the microphone hole 312 and the connection passage 327. The microphone module 330 may include a first microphone module 330-1 and a second microphone module 330-2. According to an embodiment, the sound or vibration outside the electronic device 300 may be transmitted to the first microphone module 330-1 or the second microphone module 330-2. According to an embodiment, the connection passage 327 is an empty space defined in the support member 320, and may include a microphone path and/or a microphone chamber. For example, the connection passage 327 may provide a microphone path for transmitting external sound to the microphone module 330, and at least a portion of the microphone path may be constituted with a microphone chamber including a space of a predetermined volume size or more.

According to various embodiments, the support member 320 may include a connection passage 327. According to an embodiment, the connection passage 327 may be connected to a microphone hole (e.g., the microphone hole 312 in FIG. 3A). According to an embodiment, the connection passage 327 may face at least a portion of the microphone hole 312. According to an embodiment, the sound outside the electronic device 300 may be transmitted to the microphone module 330 through the microphone hole 312 and the connection passage 327. According to an embodiment, the connection passage 327 may be interpreted as a structure spatially connected to the microphone hole 312.

According to an embodiment, the connection passage 327 may include one or more connection passages 328 and 329. For example, the connection passage 327 may include a first connection passage 328 facing at least a portion of the first microphone hole (e.g., the first microphone hole 313 in FIG. 3A) and/or a second connection passage 329 spaced apart from the first connection passage 328 and facing at least a portion of the second microphone hole (e.g., the second microphone hole 314 in FIG. 3A). The first connection passage 328 may be interpreted as a first microphone chamber by extending toward the first microphone hole 313, and the second connection passage 329 may be interpreted as a second microphone chamber by extending toward the second microphone hole 314.

Figure 5A:
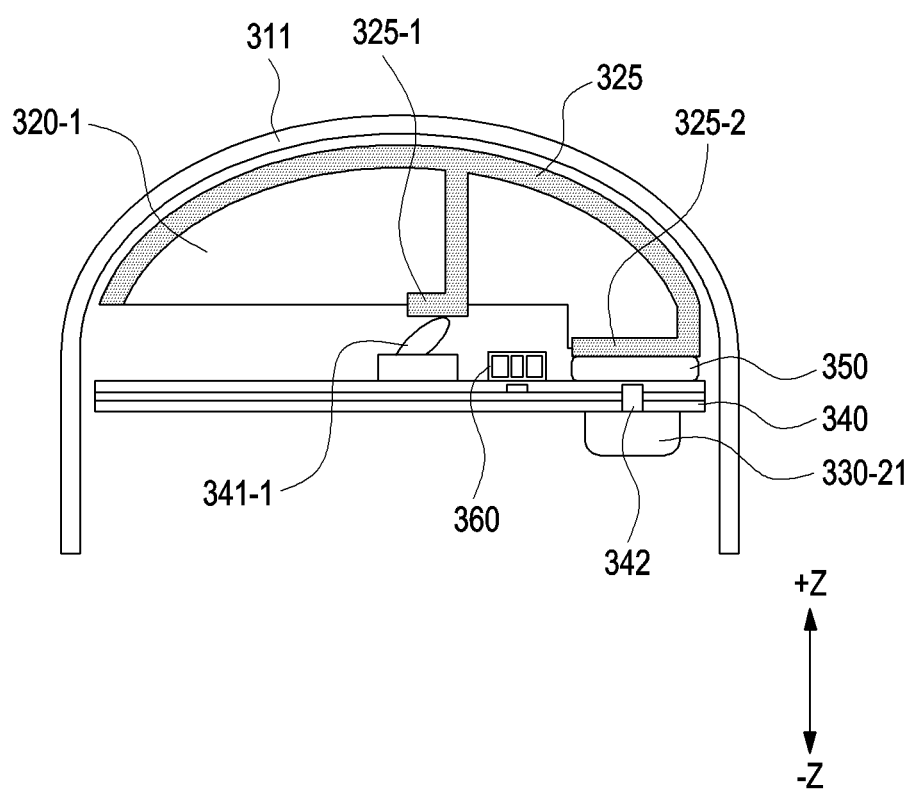
FIG. 5A is a cross-sectional view schematically illustrating an electronic device illustrated in FIG. 4D according to an embodiment of the disclosure.

FIG. 5A is a cross-sectional view schematically illustrating an electronic device illustrated in FIG. 4D according to an embodiment of the disclosure.

Figure 5B:
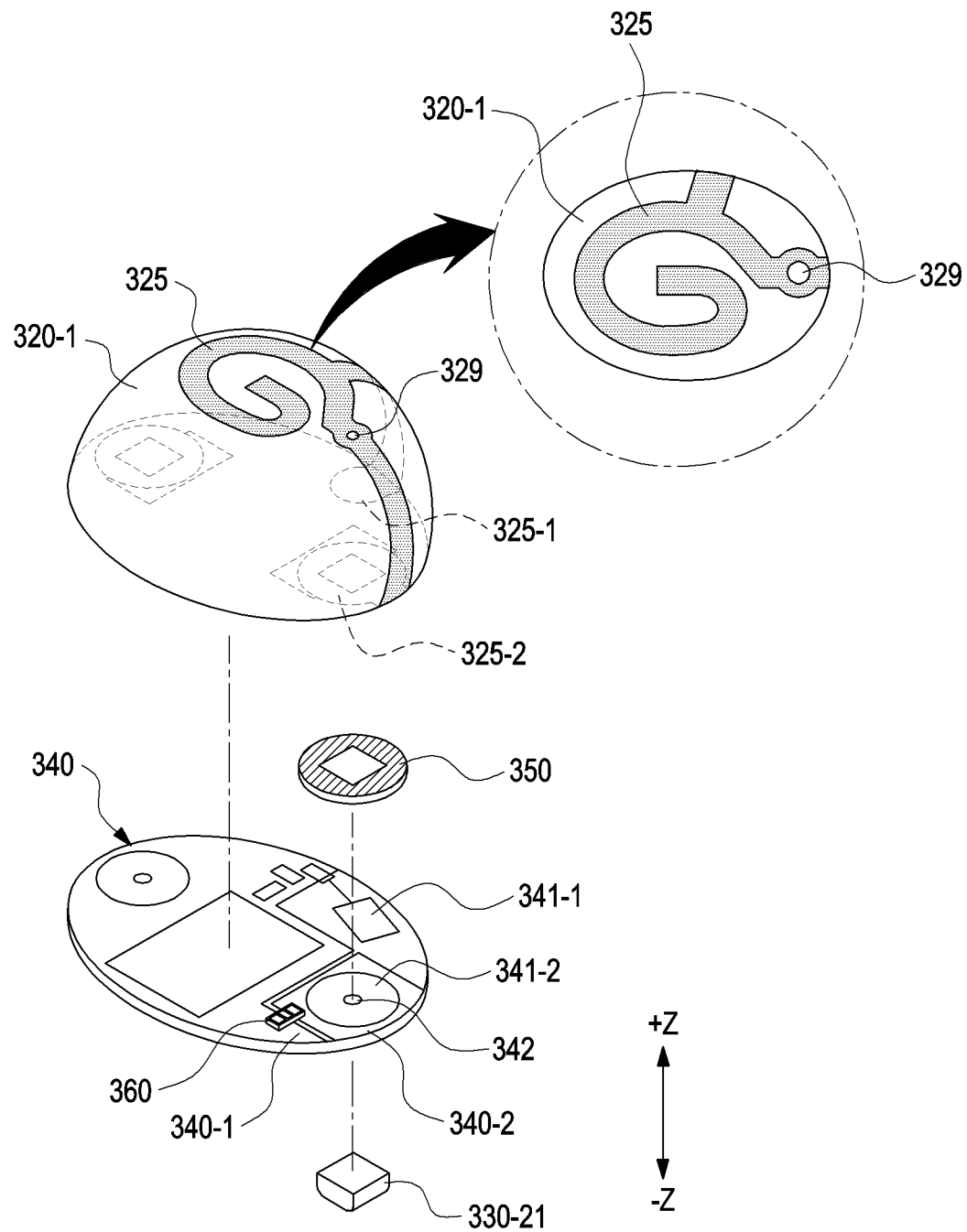
FIG. 5B is an exploded perspective view of an electronic device, which is viewed from above according to an embodiment of the disclosure.

FIG. 5B is an exploded perspective view of an electronic device, which is viewed from above according to an embodiment of the disclosure.

Figure 5C:
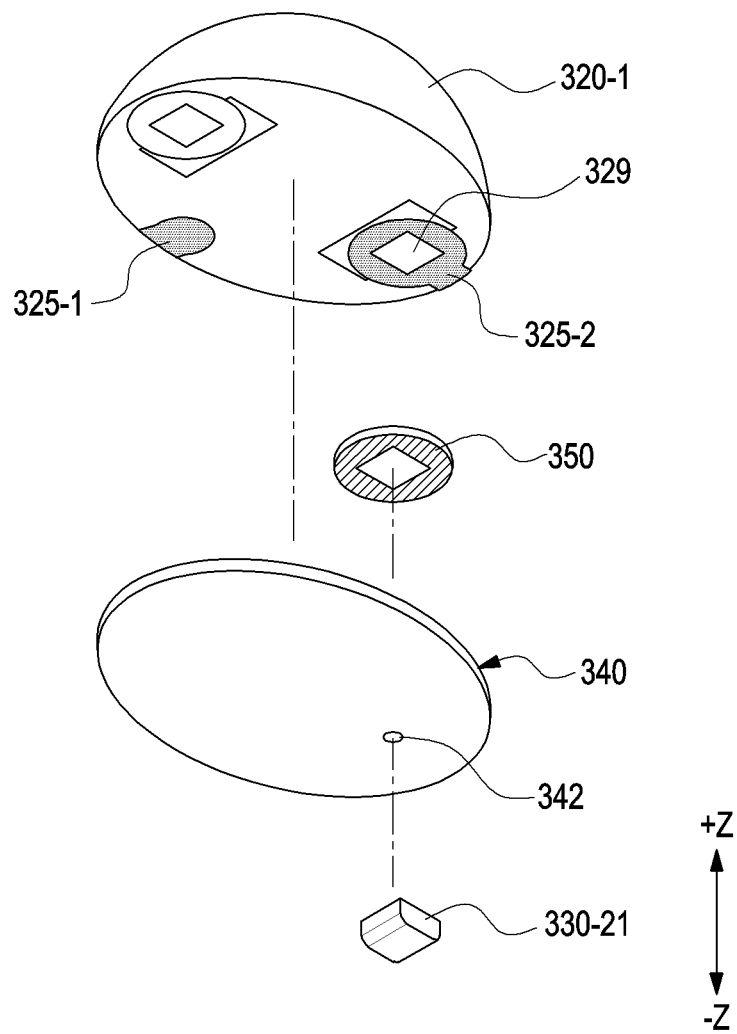
FIG. 5C is an exploded perspective view schematically illustrating an electronic, which is viewed from below according to an embodiment of the disclosure.

FIG. 5C is an exploded perspective view schematically illustrating an electronic, which is viewed from below according to an embodiment of the disclosure.

The first housing 311, the first support member 320-1, and the conductive pattern 325 illustrated in FIGS. 5A, 5B, and 5C may be the same as or similar to the first housing 311, the first support member 320-1, and the conductive pattern 325 illustrated in FIGS. 3A, 3B, 4A, 4B, 4C, and 4D. Accordingly, a description of the same components may be omitted.

According to various embodiments, the configuration of the second microphone module 330-2 to be described later may be applied to the first microphone module (e.g., the first microphone module 330-1 in FIG. 4D). Accordingly, like the configuration in which the second microphone module 330-1 includes the $(2-1)^{th}$ microphone module (e.g., the $(2-1)^{th}$ microphone module 330-21 in FIG. 5A) and the $(2-2)^{th}$ microphone module (e.g., the $(2-2)^{th}$ microphone module 330-21 in FIG. 6A), the first microphone module 330-1 may include the same configuration as that of the second microphone module. Alternatively, the first microphone module 330-1 may include an additional microphone module (not illustrated) or may be disposed at another position.

According to various embodiments, the first support member 320-1, the conductive pattern 325, the first portion 325-1, the second portion 325-2, the $(2-1)^{th}$ microphone module 330-21, a printed circuit board 340, the first electrode 341-1, the second electrode 341-2, the gasket 350, and a shunt member 360 may be disposed inside the first housing 311.

According to various embodiments, the conductive pattern 325 may be disposed on the outer surface of the first support member 320-1 (the surface facing the inside of the first housing 311). According to an embodiment, the conductive pattern 325 may be disposed between the first support member 320-1 and the first housing 311. The conductive pattern 325 may be disposed on the outer surface of the first support member 320-1 in various shapes.

According to various embodiments, the conductive pattern 325 may include a first portion 325-1 and a second portion 325-2. The first portion 325-1 and the second portion 325-2 of the conductive pattern 325 may extend along the outer surface of the first support member 320-1 or may be disposed toward the bottom surface of the first support member 320-1 (the −Z-axis direction) through a hole (a via (not illustrated)) provided in the first support member 320-1. According to an embodiment, the first portion 325-1 may be disposed to be electrically connected to the first electrode 341-1 provided on the printed circuit board 340. The second portion 325-2 may be disposed to be electrically connected to the second electrode 341-2 provided on the printed circuit board 340. According to an embodiment, the second portion 325-2 may be electrically connected to the gasket 350, and the gasket 350 may be electrically connected to the second electrode 341-2. According to an embodiment, the second portion 325-2 may be electrically connected to the second electrode 341-2 via the gasket 350. According to another embodiment, the second portion 325-2 may be disposed to be spaced apart from the second electrode 341-2 by a predetermined distance. Since the second portion 325-2 and the second electrode 341-2 are disposed to be spaced apart from each other by a predetermined distance, the second portion 325-2 and the second electrode 341-2 may act as a capacitor.

According to various embodiments, the gasket 350 may be disposed between the first support member 320-1 and the printed circuit board 340. The gasket 350 may be disposed to correspond to the position of the second portion 325-2 disposed on the first support member 320-1. A hole may be provided in at least a portion of the gasket 350, and the position of the hole provided in the gasket 350 may correspond to the second connection passage 329 of the first support member 320-1. The position of the hole provided in the gasket 350 may correspond to the position of a connection hole 342 provided in the printed circuit board 340. The gasket 350 may be made of a material capable of absorbing an impact. According to an embodiment, the gasket 350 may be made of a conductive material to electrically interconnect the second portion 325-2 disposed on the first support member 320-1 and the second electrode 341-2 disposed on the printed circuit board 340.

According to various embodiments, the printed circuit board 340 may be disposed under the first support member 320-1 (the −Z-axis direction). The first electrode 341-1 and the second electrode 341-2 may be disposed on the printed circuit board 340.

According to various embodiments, the first electrode 341-1 may be electrically connected to the first portion 325-1 of the conductive pattern 325. The communication module (e.g., the communication module 190 in FIG. 1) of the printed circuit board 340 may apply a radio frequency (RF) signal to the first electrode 341-1. An RF signal may be applied to the conductive pattern 325 via the first portion 325-1 and the first electrode 341-1. According to an embodiment, the first portion 325-1 may function as a feeding portion of the conductive pattern 325. The first electrode 341-1 may be implemented in the form of a c-clip or a pogo pin.

According to various embodiments, the $(2-1)^{th}$ microphone module 330-21 may be disposed on the printed circuit board 340. For example, the $(2-1)^{th}$ microphone module 330-21 may be the second microphone module 330-2 of FIG. 4D. According to an embodiment, the $(2-1)^{th}$ microphone module 330-21 may be disposed under the printed circuit board 340 (in the −Z-axis direction). According to an embodiment, the $(2-1)^{th}$ microphone module 330-21 may be disposed under the second area 340-2 of the printed circuit board 340 (in the −Z axis direction). The $(2-1)^{th}$ microphone module 330-21 may be disposed at a position corresponding to the connection hole 342 provided in the printed circuit board 340. At least a portion of the $(2-1)^{th}$ microphone module 330-21 may be disposed to be electrically connected to the second electrode 341-2 disposed on the printed circuit board 340. According to an embodiment, the second electrode 341-2 may be electrically connected to a ground portion of the printed circuit board 340. The second portion 325-2 of the conductive pattern 325 may be electrically connected to a ground portion of the $(2-1)^{th}$ microphone module 330-21. According to an embodiment, the second area 340-2 of the printed circuit board 340 may include a ground portion, and the ground portion of the $(2-1)^{th}$ microphone module 330-21 and the second electrode 341-2 may be electrically connected to the ground portion of the printed circuit board 340. The second portion 325-2 may function as a ground portion of the conductive pattern 325. The first portion 325-1 of the conductive pattern 325 may serve as a feeding portion to which an RF signal is applied, and since the second portion 325-2 of the conductive pattern 325 is electrically connected to a ground portion (the ground portion of the printed circuit board 340 or the ground portion of the $(2-1)^{th}$ microphone module 330-21), the conductive pattern 325 may function as a planar inverted f antenna (PIFA).

According to various embodiments, the printed circuit board 340 may include a first area 340-1 and a second area 340-2. The first area 340-1 may mean at least a portion of the printed circuit board 340, and the second area 340-2 may include at least another portion of the printed circuit board 340.

According to various embodiments, the first electrode 341-1 may be disposed in the first area 340-1, and the second electrode 341-2 may be disposed in the second area 340-2. The first electrode 341-1 and the second electrode 341-2 may be disposed between the printed circuit board 340 and the first support member 320-1.

According to various embodiments, the first area 340-1 and the second area 340-2 may be electrically separated from each other. The first area 340-1 and the second area 340-2 may each include a ground. According to an embodiment, the first area 340-1 and the second area 340-2 may be electrically connected to each other by the shunt member 360. The shunt member 360 may include an inductor and/or a capacitor.

Figure 6A:
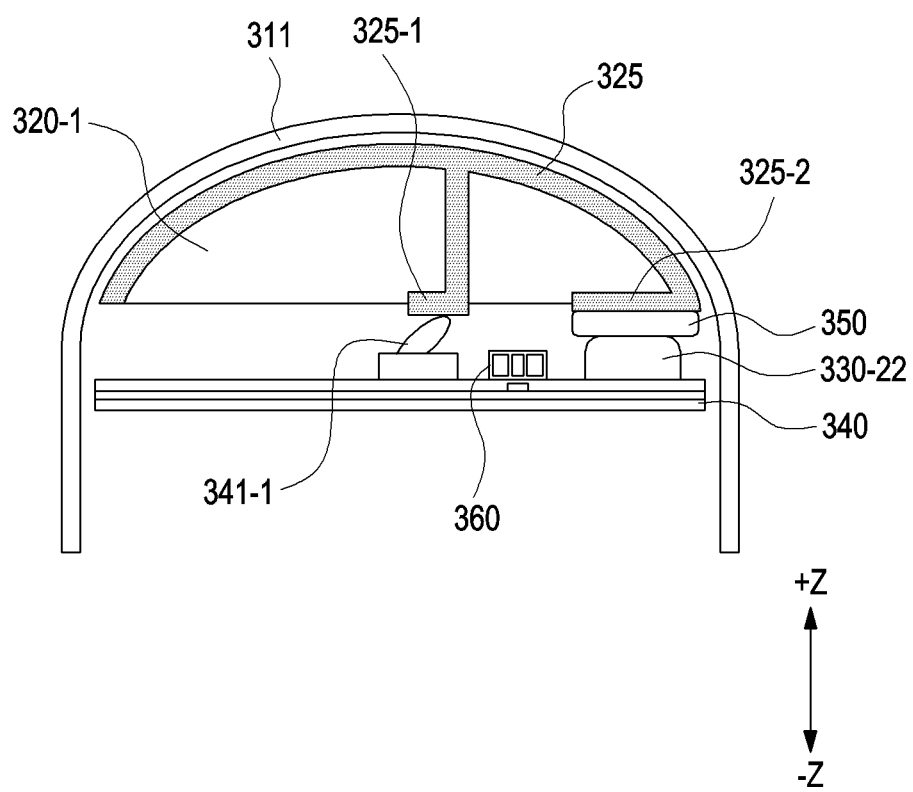
FIG. 6A is a cross-sectional view schematically illustrating an electronic device illustrated in FIG. 4D according to an embodiment of the disclosure.

FIG. 6A is a cross-sectional view schematically illustrating an electronic device illustrated in FIG. 4D according to an embodiment of the disclosure.

Figure 6B:
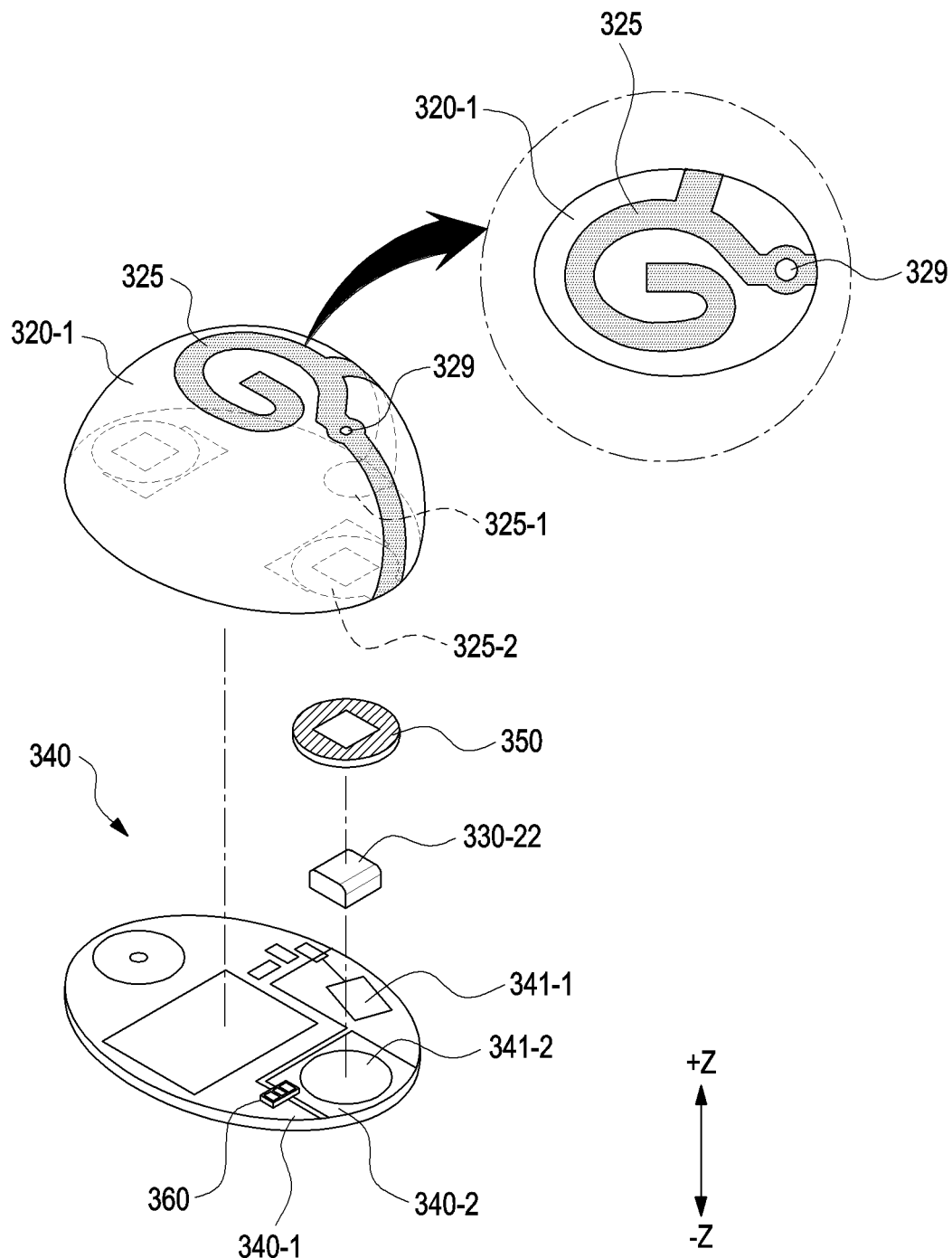
FIG. 6B is an exploded perspective view of an electronic device, which is viewed from above according to an embodiment of the disclosure.

FIG. 6B is an exploded perspective view of an electronic device, which is viewed from above according to an embodiment of the disclosure.

Figure 6C:
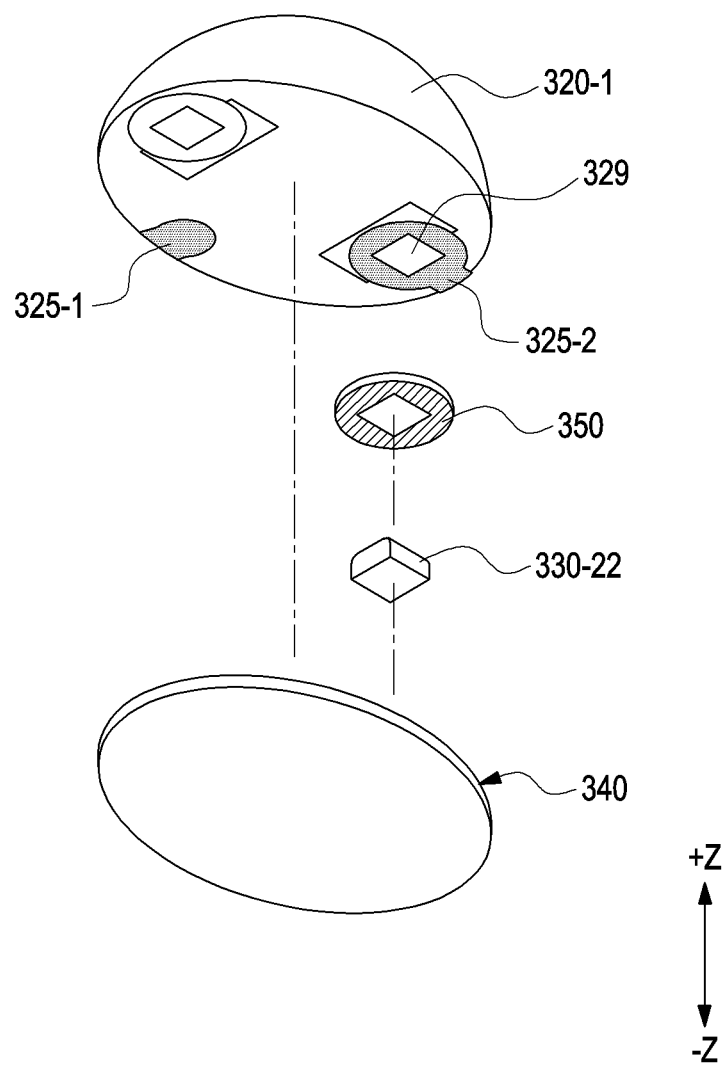
FIG. 6C is an exploded perspective view schematically illustrating an electronic, which is viewed from below according to an embodiment of the disclosure.

FIG. 6C is an exploded perspective view schematically illustrating an electronic, which is viewed from below according to an embodiment of the disclosure.

The first housing 311, the first support member 320-1, the conductive pattern 325, the first portion 325-1, the second portion 325-2, the printed circuit board 340, the first electrode 341-1, the second electrode 341-2, the gasket 350, and the shunt member 360 illustrated in FIGS. 6A, 6B, and 6C may be the same as or similar to the first housing 311, the first support member 320-1, the conductive pattern 325, the first portion 325-1, the second portion 325-2, the printed circuit board 340, the first electrode 341-1, the second electrode 341-2, the gasket 350, and the shunt member 360 illustrated in FIGS. 5A, 5B, and 5C. Accordingly, a description of the same configuration may be omitted.

According to various embodiments, the first support member 320-1, the conductive pattern 325, the first portion 325-1, the second portion 325-2, the $(2-2)^{th}$ microphone module 330-22, the printed circuit board 340, the first electrode 341-1, the second electrode 341-2, the gasket 350, and the shunt member 360 may be disposed inside the first housing 311.

According to various embodiments, the conductive pattern 325 may be disposed on the outer surface of the first support member 320-1 (the surface facing the inside of the first housing 311). According to an embodiment, the conductive pattern 325 may be disposed between the first support member 320-1 and the first housing 311. The conductive pattern 325 may be disposed on the outer surface of the first support member 320-1 in various shapes.

According to various embodiments, the conductive pattern 325 may include a first portion 325-1 and a second portion 325-2. The first portion 325-1 and the second portion 325-2 of the conductive pattern 325 may extend along the outer surface of the first support member 320-1 or may be disposed on the bottom surface of the first support member 320-1 (the −Z-axis direction) through a hole (a via (not illustrated)) provided in the first support member 320-1. According to an embodiment, the first portion 325-1 may be disposed to be electrically connected to the first electrode 341-1 provided on the printed circuit board 340. The second portion 325-2 may be disposed to be electrically connected to the second electrode 341-2 provided on the printed circuit board 340. According to an embodiment, the second portion 325-2 may be electrically connected to the gasket 350, and the gasket 350 may be electrically connected to the $(2-2)^{th}$ microphone module 330-22. The $(2-2)^{th}$ microphone module 330-22 may be electrically connected to the second electrode 341-2. According to an embodiment, the second portion 325-2 may be electrically connected to the second electrode 341-2 via the gasket 350 and/or the $(2-2)^{th}$ microphone module 330-22. According to another embodiment, the second portion 325-2 may be disposed to be spaced apart from the $(2-2)^{th}$ microphone module 330-22 by a predetermined distance. According to an embodiment, the second portion 325-2 and the $(2-2)^{th}$ microphone module 330-22 may be spaced apart from each other by a predetermined interval, and the gasket 350 may be disposed between the second portion 325-2 and the $(2-2)^{th}$ microphone module 330-22. According to another embodiment, the second portion 325-2 and the $(2-2)^{th}$ microphone module 330-22 may be spaced apart from each other by a predetermined distance, so that the second portion 325-2 and the $(2-2)^{th}$ microphone module 330-22 may act as a capacitor.

According to various embodiments, the gasket 350 may be disposed between the first support member 320-1 and the printed circuit board 340. The gasket 350 may be disposed to correspond to the position of the second portion 325-2 disposed on the first support member 320-1. A hole may be provided in at least a portion of the gasket 350, and the position of the hole provided in the gasket 350 may correspond to the position of the first connection passage 328 and/or the position of the second connection passage 329. The gasket 350 may be made of a material capable of absorbing an impact. According to an embodiment, the gasket 350 may be made of a conductive material to electrically interconnect the second portion 325-2 disposed on the first support member 320-1 and the $(2\text{-}2)^{th}$ microphone module 330-22. According to an embodiment, although not illustrated, the first microphone module 330-1 may be disposed to be in contact with the gasket 350.

According to various embodiments, the printed circuit board 340 may be disposed under the first support member 320-1 (the −Z-axis direction). The first electrode 341-1 and the second electrode 341-2 may be disposed on the printed circuit board 340.

According to various embodiments, the first electrode 341-1 may be electrically connected to the first portion 325-1 of the conductive pattern 325. The communication module (e.g., the communication module 190 in FIG. 1) of the printed circuit board 340 may apply a radio frequency (RF) signal to the first electrode 341-1. An RF signal may be applied to the conductive pattern 325 via the first portion 325-1 and the first electrode 341-1. According to an embodiment, the first portion 325-1 may function as a feeding portion of the conductive pattern 325. The first electrode 341-1 may be implemented in the form of a c-clip or a pogo pin.

According to various embodiments, the $(2\text{-}2)^{th}$ microphone module 330-22 may be disposed on the printed circuit board 340. For example, the $(2\text{-}2)^{th}$ microphone module 330-22 may be the second microphone module 330-2 of FIG. 4D. According to an embodiment, the $(2\text{-}2)^{th}$ microphone module 330-22 may be disposed on the printed circuit board 340 (in the +Z-axis direction). According to an embodiment, the $(2\text{-}2)^{th}$ microphone module 330-22 may be disposed one the second area 340-2 of the printed circuit board 340 (in the +Z axis direction). At least a portion of the $(2\text{-}2)^{th}$ microphone module 330-22 may be disposed to be electrically connected to the second electrode 341-2 disposed on the printed circuit board 340. According to an embodiment, the outer surface of the $(2\text{-}2)^{th}$ microphone module 330-22 may be disposed to be electrically connected to the second electrode 341-2. The outer surface of the $(2\text{-}2)^{th}$ microphone module 330-22 may be electrically connected to a ground portion of the printed circuit board 340 to function as a ground portion. According to an embodiment, the second portion 325-2 of the conductive pattern 325 may be connected to the second electrode 341-2 via the $(2\text{-}2)^{th}$ microphone module 330-22 and/or the gasket 350. As described above, since the second portion 325-2, the $(2\text{-}2)^{th}$ second microphone module 330-22, and the second electrode 341-2 are electrically connected to each other, the second portion 325-2 may function as a ground portion of the pattern 325. Since the first portion 325-1 of the conductive pattern 325 is connected to a feeding portion and the second portion 325-2 of the conductive pattern 325 is connected to a ground portion (the ground portion of the printed circuit board 340 or the ground portion of the $(2\text{-}2)^{th}$ microphone module 330-22), the conductive pattern 325 may function as a planar inverted f antenna (PIFA).

According to various embodiments, the printed circuit board 340 may include a first area 340-1 and a second area 340-2. The first area 340-1 and the second area 340-2 may each include a ground.

According to various embodiments, the first electrode 341-1 may be disposed in the first area 340-1, and the second electrode 341-2 may be disposed in the second area 340-2.

According to various embodiments, the first area 340-1 and the second area 340-2 may be electrically separated from each other. According to an embodiment, the first area 340-1 and the second area 340-2 may be electrically connected to each other by the shunt member 360. The shunt member 360 may include an inductor and/or a capacitor.

An electronic device (e.g., the electronic device 300 in FIG. 3A) according to various embodiments of the disclosure may include a housing (e.g., the housing 310 in FIG. 3A), a support member (e.g., the support member 320 in FIG. 4A) disposed inside the housing and forming a connection passage (e.g., the connection passage 327 in FIG. 4A), a printed circuit board (e.g., the printed circuit board 340 in FIG. 5B) disposed adjacent to the support member and including a first area (e.g., the first area 340-1 in FIG. 5B) and a second area (e.g., the second area 340-2 in FIG. 5B) spaced apart from the first area, and a conductive pattern (e.g., the conductive pattern 325 in FIG. 5B) disposed on the support member and including a first portion (e.g., the first portion 325-1 in FIG. 5C) and a second portion (e.g., the second portion 325-2 in FIG. 5C), wherein the first portion may be electrically connected to a first electrode (e.g., the first electrode 341-1 in FIG. 5B) disposed in the first area, the second portion may be electrically connected to a second electrode (e.g., the second electrode 341-2 in FIG. 5B) disposed in the second area, and the first area and the second area may be electrically connected to each other via a shunt member (e.g., the shunt member 360 in FIG. 5B).

According to various embodiments, the shunt member may include at least one of an inductor or a capacitor.

According to various embodiments, the electronic device may further include a gasket (e.g., the gasket 350 in FIG. 5B) disposed between the first portion and the second electrode.

According to various embodiments, the gasket and a microphone module (e.g., the $(2\text{-}1)^{th}$ microphone module 330-21 in FIG. 5B or the $(2\text{-}2)^{th}$ microphone module 330-22 in FIG. 6B) may be disposed adjacent to the connection passage.

According to various embodiments, the second portion, the gasket, the second electrode, and the microphone module may be electrically connected to each other.

According to various embodiments, the microphone module (e.g., the $(2\text{-}2)^{th}$ microphone module 330-22 in FIG. 6B) may be disposed on the printed circuit board and may be electrically connected to the second electrode.

According to various embodiments, the microphone module (e.g., the $(2\text{-}1)^{th}$ microphone module 330-21 in FIG. 5B) may be disposed under the printed circuit board and may be electrically connected to the second electrode.

According to various embodiments, the second area may be provided with a connection hole (e.g., the connection hole 342 in FIG. 5B), and the microphone module may be disposed to correspond to the position of the connection hole.

According to various embodiments, the first electrode may include a c-clip or a pogo pin.

According to various embodiments, at least one of a portion of the first area or a portion of the second area includes a ground.

An electronic device (e.g., the electronic device 300 in FIG. 3A) according to various embodiments of the disclosure may include a housing (e.g., the housing 310 in FIG. 3A), a support member (e.g., the support member 320 in FIG. 4A) disposed in the housing, a printed circuit board (e.g., the printed circuit board 340 in FIG. 5B) disposed adjacent to the support member and including a first area (e.g., first area 340-1 in FIG. 5B) and a second area (e.g., the second area 340-2 in FIG. 5B) spaced apart from the first area, a conductive pattern (e.g., the conductive pattern in FIG. 5B) disposed adjacent to the support member and including a first portion (e.g., the first portion 325-1 in FIG. 5C) and a second portion (e.g., the second portion 325-2 in FIG. 5C), and a microphone module (e.g., the $(2-1)^{th}$ microphone module 330-21 in FIG. 5B or the $(2-2)^{th}$ microphone module 330-22 in FIG. 6B) disposed in the second area, wherein the first portion may be electrically connected to a first electrode (e.g., the first electrode 341-1 in FIG. 5B) disposed in the first area, and the second portion may be electrically connected to a second electrode (e.g., the second electrode 341-2 in FIG. 5B) disposed in the second area, and the second electrode may be disposed adjacent to the microphone module.

According to various embodiments, the support member may be provided with a connection passage (e.g., the connection passage 327 in FIG. 4A), and the connection passage may be disposed adjacent to the second electrode.

According to various embodiments, the first area and the second area may be connected to each other via a shunt member (e.g., the shunt member 360 in FIG. 5B).

According to various embodiments, the shunt member may include at least one of an inductor or a capacitor.

According to various embodiments, the electronic device may further include a gasket (e.g., the gasket 350 in FIG. 5B) disposed between the first portion and the second electrode.

According to various embodiments, the gasket and the microphone module may be disposed adjacent to the connection passage.

According to various embodiments, the second portion, the gasket, the second electrode, and the microphone module may be electrically connected to each other.

According to various embodiments, the microphone module may be disposed on the printed circuit board and may be electrically connected to the second electrode.

According to various embodiments, the microphone module may be disposed under the printed circuit board and may be electrically connected to the second electrode.

According to various embodiments, at least one of a portion of the first area or a portion of the second area may include a ground.

According to various embodiments, the housing may include a protrusion, and at least a portion of the protrusion may be formed to be inserted into an ear of a user.

According to various embodiments, the housing may include a first housing and a second housing connected to the first housing, and the shunt member may be disposed inside the first housing.

In the foregoing detailed description of this document, specific embodiments have been described. However, it will be evident to a person ordinarily skilled in the art that various modifications can be made without departing from the scope of the disclosure.

EXPLANATION OF REFERENCE NUMERALS

300: electronic device, 310: housing, 311: first housing, 312: microphone hole, 313: first microphone hole, 314: second microphone hole, 315: second housing, 316: protrusion, 320: support member, 320-1: first support member, 320-2: second support member, 321: battery, 325: conductive pattern, 325-1: first portion, 325-2: second portion, 327: connection passage, 328: first connection passage, 329: second connection passage, 330: microphone module, 330-1: first microphone module, 330-2: second microphone module, 330-21: $(2-1)^{th}$ microphone module, 330-22: $(2-2)^{th}$ microphone module, 340: printed circuit board, 340-1: first area, 340-2: second area, 341-1: first electrode, 341-2: second electrode, 342: connection hole, 350: gasket, 360: shunt member.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a support member disposed inside the housing and forming a connection passage;
   a printed circuit board disposed adjacent to the support member and including a first area and a second area spaced apart from the first area; and
   a conductive pattern disposed on the support member and including a first portion and a second portion,
   wherein the first portion is electrically connected to a first electrode disposed in the first area,
   wherein the second portion is electrically connected to a second electrode disposed in the second area, and
   wherein the first area and the second area are electrically connected to each other via a shunt member.

2. The electronic device of claim 1, wherein the shunt member includes at least one of an inductor or a capacitor.

3. The electronic device of claim 1, further comprising:
   a gasket disposed between the second portion and the second electrode.

4. The electronic device of claim 3, wherein the gasket and a microphone module are disposed adjacent to the connection passage.

5. The electronic device of claim 4, wherein the second portion, the gasket, the second electrode, and the microphone module are electrically connected to each other.

6. The electronic device of claim 4, wherein the microphone module is disposed on the printed circuit board and is electrically connected to the second electrode.

7. The electronic device of claim 4, wherein the microphone module is disposed under the printed circuit board and is electrically connected to the second electrode.

8. The electronic device of claim 7, wherein a connection hole is formed in the second area, and the microphone module is disposed to correspond to a position of the connection hole.

9. The electronic device of claim 1, wherein the first electrode includes a c-clip or a pogo pin.

10. The electronic device of claim 1, wherein at least one of a portion of the first area or a portion of the second area includes a ground.

11. An electronic device comprising:
    a housing;
    a support member disposed in the housing;
    a printed circuit board disposed on the support member and including a first area and a second area spaced apart from the first area;

a conductive pattern disposed adjacent to the support member and including a first portion and a second portion; and a microphone module disposed in the second area, wherein the first portion is electrically connected to a first electrode disposed in the first area, wherein the second portion is electrically connected to a second electrode disposed in the second area, and wherein the second electrode is disposed adjacent to the microphone module.

12. The electronic device of claim 11, wherein the support member is provided with a connection passage, and the connection passage is disposed adjacent to the second electrode.

13. The electronic device of claim 11, wherein the first area and the second area are connected to each other via a shunt member.

14. The electronic device of claim 13, wherein the shunt member includes at least one of an inductor or a capacitor.

15. The electronic device of claim 12, further comprising:
a gasket disposed between the second portion and the second electrode.

16. The electronic device of claim 15, wherein the gasket and the microphone module are disposed adjacent to the connection passage.

17. The electronic device of claim 15, wherein the second portion, the gasket, the second electrode, and the microphone module are electrically connected to each other.

18. The electronic device of claim 11, wherein the microphone module is disposed on the printed circuit board and is electrically connected to the second electrode.

19. The electronic device of claim 11, wherein the microphone module is disposed under the printed circuit board and is electrically connected to the second electrode.

20. The electronic device of claim 11, wherein at least one of a portion of the first area or a portion of the second area includes a ground.

* * * * *